(12) United States Patent
Bogucharov et al.

(10) Patent No.: US 8,370,443 B2
(45) Date of Patent: Feb. 5, 2013

(54) RELIABLE MESSAGING USING PUBLISH SUBSCRIBE MECHANISM

(75) Inventors: Yuri A. Bogucharov, Redmond, WA (US); Mithun Arora, Hyderabad (IN); Manoj K. Agarwal, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 12/555,569

(22) Filed: Sep. 8, 2009

(65) Prior Publication Data

US 2011/0060957 A1    Mar. 10, 2011

(51) Int. Cl.
*G06F 15/16*    (2006.01)
(52) U.S. Cl. ......... 709/206; 709/203; 709/223; 709/224
(58) Field of Classification Search .................. 709/203, 709/206, 217, 219, 223, 224, 229
See application file for complete search history.

(56) References Cited

U.S. PATENT DOCUMENTS

| | | | | |
|---|---|---|---|---|
| 6,662,213 B1* | 12/2003 | Xie et al. | | 709/206 |
| 7,254,616 B1* | 8/2007 | Ennis et al. | | 709/213 |
| 7,287,066 B2* | 10/2007 | Ruggaber et al. | | 709/220 |
| 7,298,734 B2 | 11/2007 | Nabkel et al. | | |
| 7,587,450 B2* | 9/2009 | Morris | | 709/203 |
| 7,603,476 B1* | 10/2009 | Hofmann et al. | | 709/237 |
| 7,693,952 B2* | 4/2010 | Limprecht et al. | | 709/207 |
| 7,706,895 B2* | 4/2010 | Callaghan | | 700/17 |
| 7,899,921 B2* | 3/2011 | Hill et al. | | 709/230 |
| 8,234,338 B1* | 7/2012 | Dagum et al. | | 709/206 |
| 2003/0135556 A1* | 7/2003 | Holdsworth | | 709/206 |
| 2003/0195946 A1* | 10/2003 | Yang | | 709/219 |
| 2005/0096928 A1* | 5/2005 | Ruggaber et al. | | 705/1 |
| 2006/0075133 A1* | 4/2006 | Kakivaya et al. | | 709/237 |
| 2006/0123119 A1* | 6/2006 | Hill et al. | | 709/227 |
| 2006/0123479 A1 | 6/2006 | Kumar et al. | | |
| 2006/0129690 A1* | 6/2006 | Hill et al. | | 709/230 |
| 2006/0168262 A1* | 7/2006 | Frazer | | 709/230 |
| 2007/0011055 A1 | 1/2007 | Ruul | | |
| 2007/0130478 A1* | 6/2007 | Langworthy et al. | | 713/193 |
| 2008/0177829 A1* | 7/2008 | Banerjee et al. | | 709/203 |
| 2008/0228651 A1 | 9/2008 | Tapsell | | |
| 2009/0043678 A1 | 2/2009 | Bizri | | |
| 2011/0106891 A1* | 5/2011 | Gallant et al. | | 709/206 |

FOREIGN PATENT DOCUMENTS

EP    1300980 A1    4/2003

OTHER PUBLICATIONS

Configuring AS2 Party Properties http://technet.microsoft.com/en-us/library/bb245980.aspx (4 pages).
The ebXML Messaging Service http://webservices.xml.com/pub/a/ws/2003/03/18/ebxml.html?page=2 (4 pages).

(Continued)

*Primary Examiner* — Lashonda Jacobs
(74) *Attorney, Agent, or Firm* — Workman Nydegger (57) ABSTRACT

A resend operation of application-level messages by communicating control messages over a publish/subscribe channel. A sending module sends application-level original messages to recipients, and stores a copy of the original message in a store. A resend determination module determines, in the event of insufficient acknowledgement of the original message, whether the original message should be resent. If the original message should be resent, the resend determination module also publishes a control message that correlates to the original message. A resend module subscribes in a manner that results in the resend module receiving the control message, and uses the control message to determine that the corresponding original message should be resent, whereupon the original message may be resent using the copy of the original message in the store.

20 Claims, 3 Drawing Sheets

OTHER PUBLICATIONS

AS2 Secures Documents using the Web http://www.networkworld.com/news/tech/2002/1209techupdate.html?page=1 (2 pages).

EDIINT AS1 and AS2 Transport Communication Guidelines http://www.gs1.org/docs/gsmp/EDIINT_AS1_AS2_Transport_Comm_Guide_i1.pdf (24 pages) Issue 1, Feb. 2006.

MIME-Based Secure Peer-to-Peer Business Data Interchange Using HTTP http://www.ietf.org/rfc/rfc4130.txt (44 pages) Jul. 2005—Drummond Group Inc.

* cited by examiner

RELIABLE MESSAGING USING PUBLISH SUBSCRIBE MECHANISM

BACKGROUND

Applicability Statement 2 (or "AS2") is a specification for sending messages securely over the Internet. In this specification, application-level messages (hereinafter simply "messages") are typical sent using the HyperText Transfer Protocol (HTTP) or HTTP Secure (HTTPS) protocol. Following AS2, each original message normal requests an acknowledgement in the form of a Message Disposition acknowledgement (or "MDN"), which is a separate application-level message dispatched in the body of an HTTP or HTTPS message or perhaps even by e-mail.

The MDN includes a receipt for the original message. That receipt may be signed or unsigned by the recipient of the original message and the sender of the acknowledgement on the original message. The term Non-Repudiation of Receipt (NRR) is often used in combination with such receipts, and refers to a legal event that occurs only when the sender of the original message has verified a signed receipt coming back from recipient of the original message by confirming that the receipt was properly signed by the recipient, and by confirming that the signed receipt correlates to the original message.

Although not part of the AS2 specification, at least at present, the publish/subscribe paradigm also has some relevance for the principles described herein, and thus will be summarized. Publish/subscribe (or pub/sub) is an asynchronous messaging paradigm where senders (publishers) of messages are not programmed to send their messages to specific receivers (subscribers). Rather, published messages are characterized into classes, without knowledge of what (if any) subscribers there may be on each of those classes. Subscribers express interest in one or more classes, and only receive messages that are of interest, without knowledge of what (if any) publishers there are. This decoupling of publishers and subscribers can allow for greater scalability and a more dynamic network topology, and is implemented in a large number of messaging platforms.

BRIEF SUMMARY

Embodiments described herein relate to a computing system that performs a resend operation of application-level messages by communication control messages over a publish/subscribe channel. A sending module sends application-level original messages to recipients, and stores a copy of the original message in a store. An acknowledgement module detect whether or not an application-level acknowledgement of the original message is received. A resend determination module determines, in the event of an absent or insufficient acknowledgement of the original message, whether the original message should be resent. If the original message should be resent, the resend determination module also publishes a control message that correlates to the original message. A resend module subscribes in a manner that results in the resend module receiving the control message, and uses the control message to determine that the corresponding original message should be resent. In response, the resend module resends the original message using the copy of the original message in the store.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a resend operation of application-level messages by communication of control messages over a publish/subscribe channel. First, a computing system of an infinite variety of computing systems in which the principles described herein may operate will be described with respect to FIG. 1. Then, the resent operation will be described with respect to FIGS. 2 and 3.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
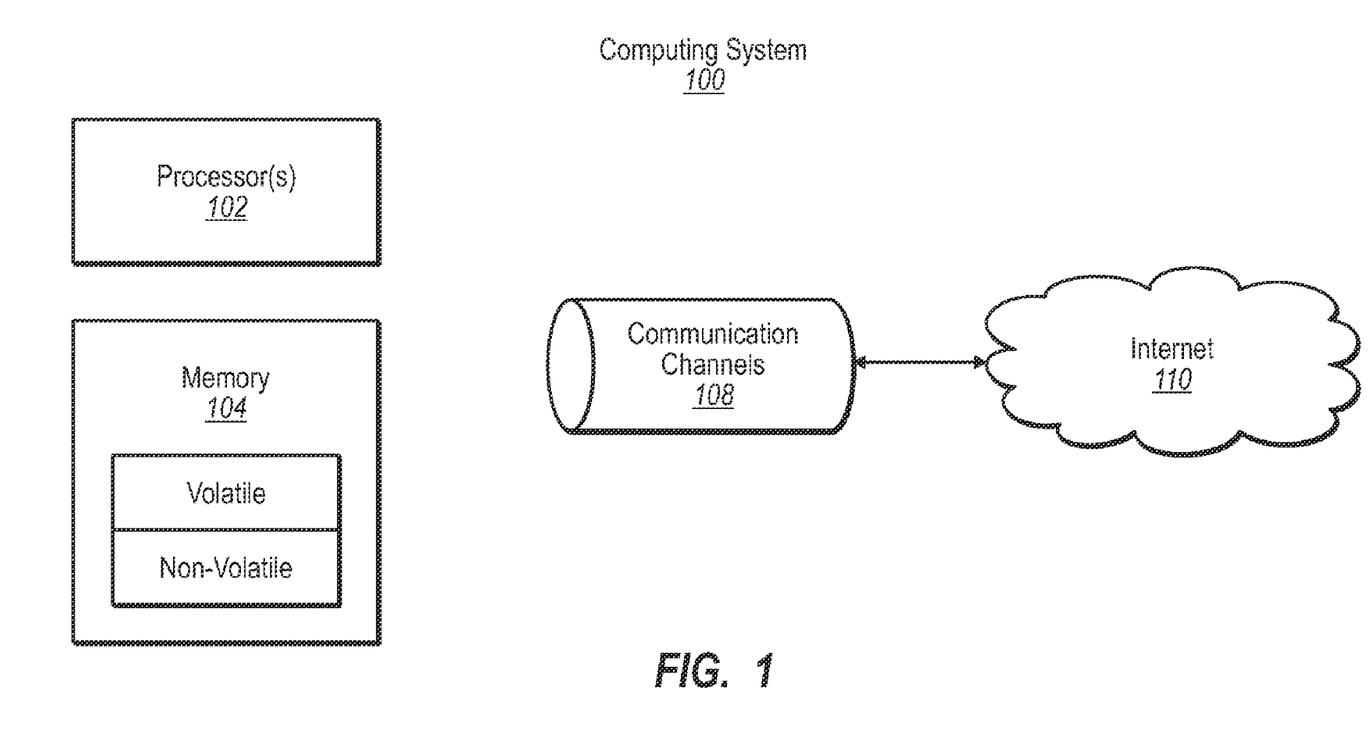
FIG. 1 illustrates a suitable computing system in which all or some of the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments described herein also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
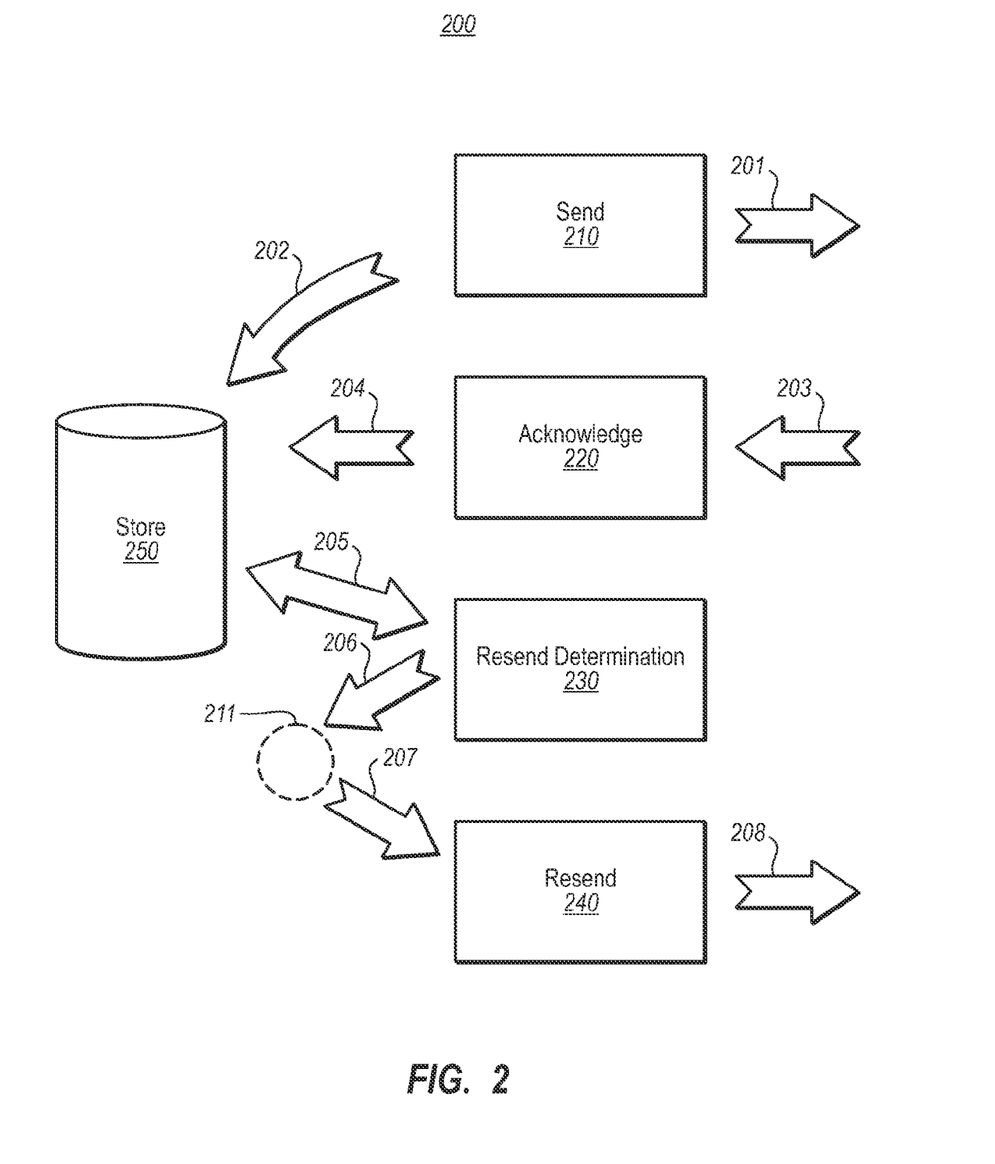
FIG. 2 schematically illustrates a variety of modules serving to send and resend application-level messages.

FIG. 2 illustrates a computer architecture 200 that may be implemented in the computing system 100 of FIG. 1. The computer architecture 200 includes a number of modules 210, 220, 230 and 240 and a message store 250. The modules 210, 220, 230 and 240 may each be implemented as a hardware module in which case the module might be, for example, a solid-state device. Alternatively, the module 210, 220, 230 and 240 may be each be implemented as software modules, in which case the modules 210, 220, 230, and 240 may each be considered to be the physical combination of a memory (e.g., memory 104 of FIG. 1) upon which the computer-executable instructions reside, and one or more processors (e.g., processor(s) 102 of FIG. 1) that execute those computer-executable instructions to provide the functionality attributed to the modules 210, 220, 230, 240. Whether implemented in hardware or software, the modules may be considered to be part of a physical and tangible computing system.

While the modules 210, 220, 230 and 240 will be described as having specific functionality, the functionality attributed to any one module may be split into multiple separate hardware or software modules as appropriate. Furthermore, the functionality attributed to any one module may be combined with the functionality provided by another module to provide a consolidated module without departing from the principles described herein. Nevertheless, for purposes of clarity, the modules 210, 220, 230 and 240 will be described herein as separate modules in a specific example.

The computer architecture 200 includes a sending module 210, an acknowledgement module 220, a resend determination module 230, and a resend module 240. The functionality attributed to the modules as described below should not be construed as a statement that the module is limited to that specific functionality.

The sending module 210 might be, for example, a first send port. A "port" is a software or hardware module that is capable of interfacing application-level messages with a network. A "send port" is a port that interfaces with a network by sending application-level messages over a network, whereas a "receive port" is a port that interfaces with a network by receiving application-level message. A "send and receive port" is a port that is capable of both sending and receiving such messages.

The sending module 210 is configured to initially send application-level messages to designated recipient(s), where the recipient may be the same for each application-level message, but more likely might change from one application-level message to another. The process of sending such application-level messages is symbolized with arrow 201.

In conjunction with this send operation, the sending module 210 might also store a copy of the original application-level message in the store 250, which might be a locally-accessible store such as a local database. This storing operation is symbolized with arrow 202. The storing operation is done in order to facilitate a resend should it be decided that a resend should occur at some point. If, for some reason, it is immediately apparent that a resend will not occur for a particular application-level message, the storing operation 202 may, but need not be, eliminated with respect to that particular application-level message.

In order to facilitate an efficient resend of the application-level message, the copy of the stored application-level message may be a wire-formatted copy. This might be advantageous to conform with a particular protocol, or perhaps just to minimize the amount of processing required to resend the message. The wire-formatted copy may have been obtained while preparing the original message for sending over the network. Alternatively, the stored copy of the message might be an intermediate format that represents the application-message in some intermediate format that is not quite directly interpretable by an application without further processing, and which is not quite ready to transmit on the wire without further processing.

In one embodiment, the send application-level messages might be sent using a HyperText Transfer Protocol. That is, however, not at all required. If HTTP is used, however, the body or some header of each message may indicate whether a receipt is requested, and whether the receipt should be signed or unsigned by the recipient. In that case, the recipient might honor this request by dispatching an application-level acknowledgement message corresponding to the original message. The application-level acknowledgement message may include a receipt, which may be signed or unsigned, as requested in the original message.

The acknowledgement module 220 detects whether or not an application-level acknowledgement of the original message is received. Such a potential receiving of the acknowledgement message is represented in FIG. 2 using arrow 203. An acknowledgement message may not always be received for each sent message. For example, perhaps the original message never arrived at its designation, or perhaps was not processed by the recipient. Alternatively, perhaps the original message was processed, but the acknowledgement message never arrived at the sender. In any case, without an acknowledgement message, the sender cannot reliably know whether the original message was received by the recipient, at least not by the acknowledgement mechanism.

If the acknowledgement module 220 does detect a positive acknowledgement of receipt of the corresponding application-level original message, then the acknowledgement module 220 might do different things depending on the particular embodiment.

As an example, the acknowledgement module 220 might simply delete the copy of the original message stored in the 250 store under all conditions once a positive acknowledgement of receipt is received. In another embodiment, perhaps the acknowledgement module 220 merely distinguishes (e.g., flags) the corresponding copy of the original message stored in the store 250 to somehow reflect that positive acknowledgement has been obtained for that message. Later, a garbage cleaning process may determine whether to delete that flagged copy of the message from the store.

In another embodiment, the acknowledgement module 220 may identify a non-repudiation of receipt status of the original message. A non-repudiation of receipt status is essentially a status identifying whether or not the recipient definitively received the original message. This status may be determined when the acknowledgement message returned by the recipient of the original message is signed. If signed, the acknowledge module 220 may authenticate the signer of the receipt assuming the receipt is signed, confirm that the receipt corresponds to the original message, and compare that identified signer against the recipient specified in the original message. If the identified signer and the identified recipient match, the recipient cannot persuasive assert that they never received the message. In this case, upon receiving a signed receipt that may be used to prove a non-repudiation of receipt status, the acknowledgement module 200 may keep the copy of the original message in the store 250, additionally provide the signed receipt in the store in a manner that the signed receipt is associated with the copy of the original message, and may update its state to reflect that the original message has a positive non-repudiation of receipt status. The further interaction of the acknowledgement module 220 with the local store 250 upon receipt of a positive acknowledgement message is symbolized using arrow 204.

The resend determination module 230 performs its functions with respect to a particular sent application-level original message when an acknowledgement message is not received. In particular, recall that when the original message was sent (represented by arrow 201), a copy of the original message was saved in the local (represented by arrow 202). In addition to the copy of the original message, perhaps resend parameters may have also be saved by the sending module 210 into the store 250.

The resend determination module 230 periodically checks the stored messages in the store to determine whether their resend parameters indicate that a resend should occur. This checking operation is symbolized by bi-directional arrow 205. The resend parameters might include, for example, a maximum number of resend attempts, a minimum interval between resend attempts, a maximum duration of the resend operations, and so forth.

A "resend" of an application-level message is to be distinguished from a "retry" of an application-level message as will now be explained with respect to the AS2 protocol using HTTP as the underlying transport protocol. Up until now, this description has discussed only the resend operation.

"Retry" is the term used in this description to describe a retransmission that occurs due to some failure notice that occurs below the application level. For example, in the context of AS2 using HTTP, when attempting to send a message using the POST method available in HTTP, the initial sender can encounter transient exceptions that result in a failure to obtain a HTTP status code or a transient HTTP error such as 503. In this case, an additional POST of the same message would occur, with the same content (including the Message Integrity Check value) and with the same Message-ID value. A retry can occur after a few seconds delay or on a schedule. Retrying ceases when a message is sent (which is indicated by receiving a HTTP 200 range status code), or when a retry limit is exceeded. In a case where there are underlying retries, the resend parameters might also include a maximum number of retries per send, a minimum interval between retries, a maximum duration of the retries in a given send or resend, and so forth.

"Resend", on the other hand, as used in this description refers to a retransmission that occurs due to some failure to receive a proper acknowledgement at the application level. For instance, in the AS2 protocol, the sent application-level message requests a Message Disposition acknowledgement (or "MDN") which is requested to be signed or unsigned. This MDN message is an application-level acknowledgment. When a MDN is not received in a timely manner, the initial sender may choose to resend the original message. Because the message has already been sent, but has presumably not been processed according to expectation, the same message, with the same content and the same Message-ID value is sent again.

The resend determination module 230 is configured to determine, in the event of an absent or insufficient acknowledgement of the original message, whether the original message should be resent. If the message is to be resent, the resend determination module 230 uses a publish/subscribe paradigm to signal the resend message of the same. For instance, the resend determination module 230 publishes a control message that identifies the message to be resent, and publishes that control message. Such publication is symbolized in FIG. 2 using arrow 206 leading into container 211, which may be thought of as a conceptual container that have messages of particular characteristics (e.g., control messages). Subscribing entities may then subscribe to such messages causing the subscriber to receive the message. For instance, resend module 240 may subscribe to messages having the characteristics of messages in the container 211, thereby causing the rend module 240 to receive the control message as symbolized by arrow 207.

The resend module 240 is configured to use the control message to determine that the corresponding original message should be resent. The resend module 240 then resends the original message using the stored copy of the original message in the store. If the copy of the original message in the store is in wire-format, very little processing of the message is needed to resend the message. The resend operation is symbolized by arrow 208. As part of the resend operation, the resend determination module 230 or the resend module 240 may update the resend parameters to show an additional resend attempt.

Figure 3:
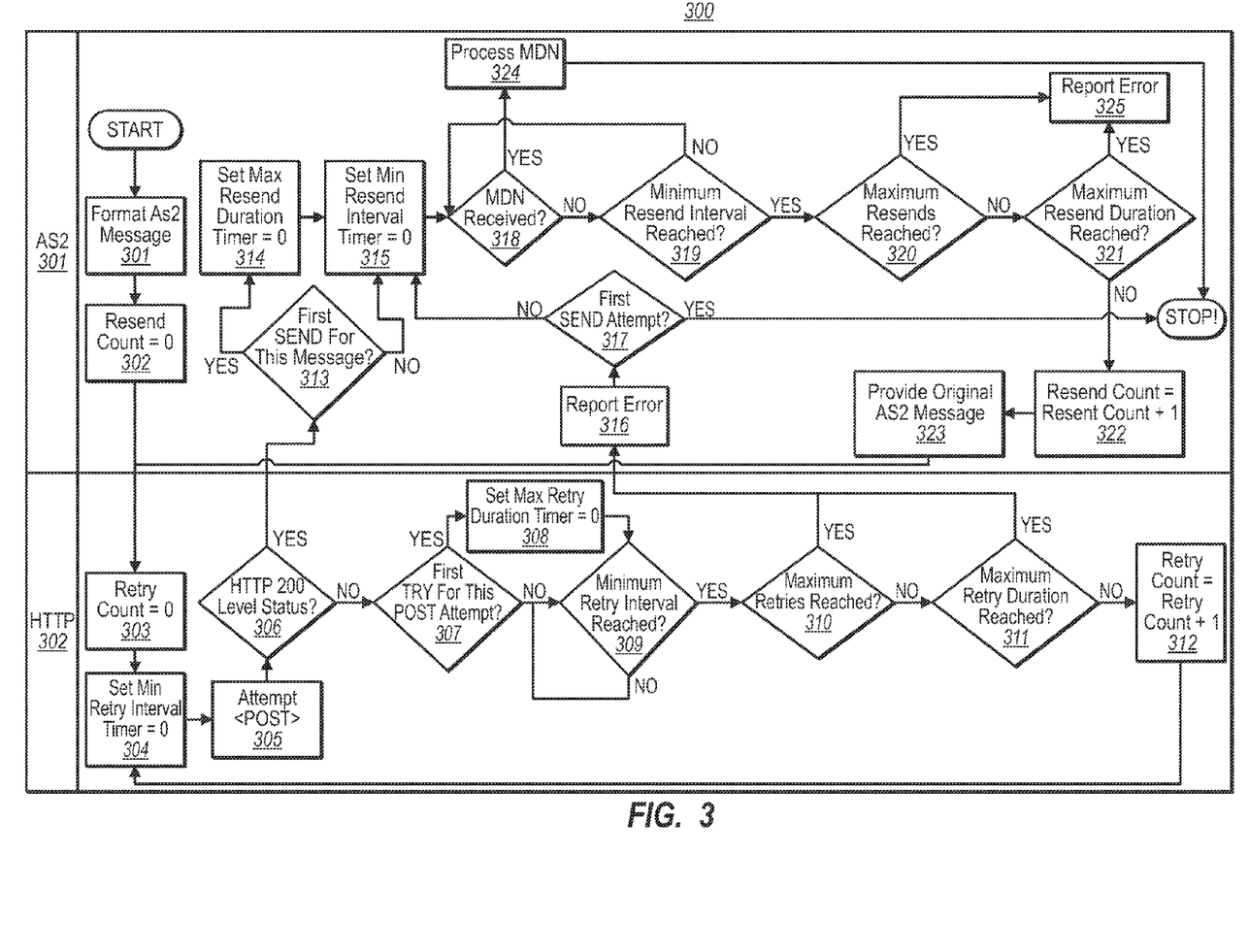
FIG. 3 illustrates a flowchart of a specific method for resending application-level messages.

FIG. 3 illustrates a flowchart 300 showing how retries and resends may occur in the context of the AS2 protocol using HTTP, even though the AS2 protocol provides no specific provisions for resending. Section 301 shows actions taken at the application-level (at the AS2 level in this example), and section 302 shows actions taken below the application-level (at the HTTP level in this example).

First, the application-level message is formatted (act 301). In the case of AS2, the AS2 payload of the HTTP message is formatted. Once again, this is a very specific example, and the broader principles are not limited to this specific example. The specific example is only provided to assist in understanding a wide variety of underlying implementations that are enabled using the broader principles. In this case, the resend count is set to zero (act 302). Processing then proceeds from the application-level to the lower HTTP level.

Specifically, in the HTTP level, the retry count is set to zero (act 303). Note that there is a distinct difference between a retry and a resend, hence the use of distinct counters for each. A Min Retry Interval Timer is then reset to zero (act 304).

The HTTP level process may then formulate the appropriate HTTP Post request (with the appropriate application-level payload) and dispatch the HTTP Post message (act 305). Although not shown in FIG. 3, at this stage, a copy of the wire-formatted message may be saved to the store. An HTTP status of 200 (Yes in decision block 306) would be representative that the message was properly dispatched to the recipient at the transport level (i.e., a successful try), but not necessarily that the application-level recipient has properly processed the application-level content (i.e., not necessarily a successful send). The case of a successful try (Yes in decision block 306) will be deferred for now until later in this description. Instead, for now, the remainder of the processing at the HTTP level will be described, which occurs if there is no 200 HTTP status returned (No in decision block 306).

If this is the first try for this send (Yes in decision block 307), then the Max Retry Duration Timer is reset to zero (act 308). Then, it is determined whether the minimum retry interval has been reached (decision block 309). This determination may be made by referring to the Min Retry Interval Timer that was reset in act 304, and that has been timing ever since that reset operation, and by comparing that timer to the minimum retry interval specified in the resend parameters stored with the message. If the minimum retry interval has not been reached (No in decision block 309), then processing may essentially pause until the minimum retry interval has been reached (Yes in decision block 309). At that stage, if the maximum number of retries is not yet reached (No in decision block 310), and the maximum retry duration is not yet reached (No in decision block 311), then the retry count is incremented by one (act 312) to reflect that another retry of the send is imminent. Note that the determination of whether the maximum retry duration is reached (decision block 310) may be made by comparing the current value of the retry count with the maximum number of retries parameter available in the resend parameters. Furthermore, the determination of whether the maximum retry direction is reached (decision block 311) may be made by comparing the current value of the Max Retry Duration Timer reset in act 308, with the maximum retry duration in the resend parameters.

The message would then be retried by once again setting the Min Retry Interval Timer to zero (act 304), and reattempting the HTTP Post transmission (act 305). If no HTTP status 200 message was received a second time, then it would be determined that this is not the first try for this POST attempt (No in decision block 307), and thus the Max Retry Duration Timer would not be reset, but would be allowed to continue running. Instead, the processing would proceed directly into the determination of whether the minimum retry interval had been reached (decision block 309).

In this processing example, there are essentially three ways for processing to be returned from the HTTP level to the higher application level. One is to receive an HTTP status 200 message (Yes in decision block 306) in response to one of the HTTP Post attempts. Another would be to determine that the maximum number of retries for this send have been reached (Yes in decision block 310), or to determine that the maximum retry duration has been reached (Yes in decision block 311).

If an HTTP status 200 response is returned in response to any HTTP Post request (Yes in decision block 306), then it is determined whether this is the first send for this message (decision block 313). Recall that a send is different than a try as defined above. If this is the first send for the message (Yes in decision block 313), then the Max Resend Duration Timer is reset to zero (act 314). In addition, the Min Resend Interval Timer is reset to zero (act 315). Otherwise, if this was not the first send for the message (No in decision block 313), then the Max Resend Duration Timer would be allowed to continue to run, and instead processing would merely reset the Min Resend Interval Timer (act 315).

This point in processing may also be arrived at if a particular send failed because the previous retries for a send did not result in a successful HTTP status 200 message before the maximum number of retries for that send was reached (Yes in decision block 310) or before the maximum retry duration has been reached (Yes in decision block 311). In that case, an error is reported (act 316). If this was the first send attempt (Yes in decision block 317), then it is likely that there is some connectivity problem below the application level, and thus a further resend is not attempted (STOP in FIG. 3). On the other hand, if this is not the first send attempt (No in decision block 317), this means that at some point in the past, an HTTP status 200 was returned in response to a try in a prior send, and thus performing a resend might be fruitful. Accordingly, processing at that stage proceeds to set the Min Resend Interval Timer to zero (act 315), which once again allows the Max Resend Duration Timer to continue.

At this stage, it is determined if an application-level acknowledgement of the message is received (decision block 318), which is an MDN acknowledgement message in the AS2 protocol. If the application-level acknowledgement has not been received (No in decision block 318), and if the minimum resend interval has not yet been reached (No in decision block 319), then processing pauses until the minimum resend interval has been reached (Yes in decision block 319). This determination can be made by comparing the current value of the Min Resend Interval Timer reset in act 315 with the minimum resend interval parameters stored as part of the resend parameters of the message.

Once the minimum resend interval has been reached (Yes in decision block 319), it is determined whether the maximum number of resends has been reached (decision block 320). This determination may be made by comparing the resend count reset in act 302, with the maximum resend parameter stored as part of the resend parameters for the message. If the maximum number of resends has not been reached (No in decision block 320), then it is determined whether the maximum resend duration has been reached (decision block 321). If the maximum resend duration has not been reached (No in decision block 321), then the resend count is incremented by one (act 322), and the saved copy of the application-level message is once again provided from the store (act 323) for initiation of another resend. The resend will require one or more HTTP Post attempts and thus processing would proceed at that stage to reset the retry count to zero (act 303), and so forth as previously described.

If, once the Min Reset Interval Timer is reset (act 315), it is determined that the application-level acknowledgement is received (Yes in decision block 318), then that application-level acknowledgement may be processed (act 324). This might involve, for example, deleting the copy of the message from the store, flagging that copy of the message in the store, confirming a non-repudiation of receipt status, storing information needed to prove that status in the store, and so forth. The processing would then complete for that message (STOP in FIG. 3).

Otherwise, if the application-level acknowledgement is not received (No in decision block 318), the minimum retry interval is reached (Yes in decision block 319), and either the maximum number of resends has been reached (Yes in decision block 320), or the maximum resend duration has been reached (Yes in decision block 321), then an error is reported (act 325) and the processing of that message has ended in a failure to transmit the message (STOP in FIG. 3).

At least some embodiments of the above approach to resending application-level message have a number of advantages. The solution maintains a small impact on memory and processing since the whole message need not be stored in memory. It is persisted in the database and can be directly pulled from there. Furthermore, storage space is saved in the case where non-repudiation of receipt status is to be confirmed since a copy of the same message is already saved for non-repudiation of receipt purposes. Also, the solution is scalable and the resend of a message sent from one machine can be done from a different machine. This is achieved by virtue of using a subscriber (which can be on a different machine) to perform the resend. Finally, by polling periodically for all messages that need to be resent (as opposed to having an always active orchestration per outgoing message), we obtain low memory and thread overhead.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A physical computing system comprising:
   one or more processors; and
   one or more computer-readable storage media storing computer-executable instructions that, when executed by the one or more processors, are configured to instantiate:
   a sending module that is configured to send an application-level original message to a recipient, and to store a copy of the original message in a store;
   an acknowledgement module that is configured to detect whether or not an application-level acknowledgement of the original message is received from the recipient;
   a resend determination module that is configured to determine, in the event of an absent or an insufficient acknowledgement of the original message from the recipient, whether the original message should be resent to the recipient, and when the original message should be resent to the recipient, to publish a control message to at least a resend module, the control message correlating to the original message; and
   the resend module, which is configured to subscribe to control messages that are published by the resend determination module in a manner that the resend module receives the published control message when published by the resend determination module, the resend module being further configured to use the control message to determine that the corresponding original message should be resent to the recipient, and to resend the original message to the recipient using the stored copy of the original message in the store when the resend module determines that the original message should be resent.

2. The physical computing system in accordance with claim 1, wherein the store is a local store.

3. The physical computing system in accordance with claim 1, wherein the copy of the original message is a wire-formatted copy of the original message.

4. The physical computing system in accordance with claim 1, wherein the copy of the original message is an intermediate format copy of the original message.

5. The physical computing system in accordance with claim 1, wherein the sending module, the acknowledgement module, the resend determination module and the resend module are all solid-state physical modules that are instantiated by executing the computer-executable instructions by the one or more processors of the physical computing system.

6. The physical computing system in accordance with claim 1, wherein the sending module, the acknowledgement module, the resend determination module and the resend module are software modules that are implemented by executing the computer-executable instructions by the one or more processors of the physical computing system.

7. The physical computing system in accordance with claim 1, wherein the acknowledgement module is configured to delete the copy of the original message stored in the store in response to a positive acknowledgement of receipt present in an application-level acknowledgement of the original message at least under some circumstances.

8. The physical computing system in accordance with claim 1, wherein the acknowledgement module is configured to keep the copy of the original message stored in the store in response to a positive acknowledgement of receipt present in an application-level acknowledgement of the original message at least under some circumstances.

9. The physical computing system in accordance with claim 8, wherein the circumstances under which the acknowledgement module will keep the copy of the original message in the store in response to a positive acknowledge include a situation in which non-repudiation of receipt is confirmed for the original message.

10. The physical computing system in accordance with claim 8, wherein if the original message has had a positive acknowledgement of receipt, the kept copy of the original message in the store is distinguished from messages in the local store that do not have a positive acknowledgement of receipt.

11. The physical computing system in accordance with claim 8, wherein if the original message has had a positive acknowledgement of receipt, and the receipt is determined to indicate a non-repudiation of receipt status, the original message in the store is distinguished from messages in the local store that do not have a non-repudiation of receipt status.

12. The physical computing system in accordance with claim 1, wherein the sending module sends the original message using a HyperText Transport Protocol.

13. The physical computing system in accordance with claim 1, wherein the resend determination module is configured to delete the copy of the original message from the store in the event that the resend determination module determines that the original message should not be resent in the absence of insufficiency of the acknowledgement of the original message.

14. A computer-implemented method for resending at least a portion of a plurality of application-level messages, the method comprising the following:

an act of a sending module executing on at least one processor of a computing system sending an application-level original message corresponding to each of a plurality of application-level messages to corresponding message recipients, and storing a copy of each corresponding application-level message in a store;

an act of an acknowledgement module of the computing system determining that an application-level acknowledgement has not been received for each application-level original message that is part of a first subset of the plurality of application-level messages, and determining that an application-level acknowledgement has been received for each application-level original message that is not part of the first subset of the plurality of application-level messages;

an act of a resend determination module of the computing system determining that a second subset of the plurality of application-level messages are to be resent, the second subset of the plurality of application-level messages being all or a portion of the first subset of the plurality of application-level messages for which an application-level acknowledgement has not been received;

for each application-level message in the second subset of application-level messages, an act of the resend determination module publishing a corresponding control message to at least a resend module of the computing system, each corresponding control message identifying the corresponding application level message;

an act of the resend module of the computing system subscribing to any control messages that are published by the resend determination module in a manner that the resend module receives the published control messages when published by the resend determination module; and for each application-level message in the second subset of application-level messages, an act of the resend module of the computing system using the corresponding control message and the copy of the corresponding application-level message in the store to resend the corresponding application-level message.

15. The method in accordance with claim 14, further comprising an act of the sending module storing resend metadata along with a copy of each of the application-level original messages as they are sent, the resend metadata for each corresponding application-level original message defining conditions upon which the corresponding application-level message is to be resent.

16. The method in accordance with claim 15, wherein the act of the resend determination module of the computing system determining whether or not the corresponding application-level message is to be resent is performed by the resend determination module evaluating the corresponding resend metadata for the application-level message.

17. The method in accordance with claim 14, further comprising:
an act of the acknowledgement module deleting the corresponding copy of the application-level message from the store for at least some of the application-level messages in the first subset of application-level messages for which an acknowledgement has been received.

18. The method in accordance with claim 14, further comprising:
an act of the identifying a non-repudiation of receipt status for at least a portion of the first subset of application-messages.

19. The method in accordance with claim 18, further comprising:
an act of the acknowledgement module flagging the corresponding copy of the application-level message from the store for the at least the portion of the first subset of application messages that have been confirmed as having a non-repudiation of receipt status.

20. A computer program product comprising one or more computer-readable storage media storing computer-executable instructions that, when executed by the one or more processors, are configured to cause a computer system to implement a method for resending at least a portion of a plurality of application-level messages, the method comprising the following:
a sending module sending a plurality of application-level original messages to a recipient, and storing a copy of each corresponding original message in a store along with resend metadata that defines conditions for resending each corresponding application-level message;
an acknowledgement module detecting whether or not an application-level acknowledgement of the original message is received for each of the original messages sent by the sending module;
a resend determination module determining, for each of the sent original messages for which the acknowledgement of the original message is absent or insufficient, and using the corresponding resend metadata, whether the original message should be resent, and when the original message should be resent, publishing a control message to at least a resend module, the control message correlating to the original message; and
the resend module subscribing to control messages that are published by the resend determination module in a manner that the resend module receives any control messages published by the resend determination module, using the control message to determine that the corresponding original message should be resent to the recipient, and resending the original message using the stored copy of the original message in the store when the resend module determines that the original message should be resent to the recipient.

* * * * *